US006965921B2

(12) United States Patent
Lu et al.

(10) Patent No.: US 6,965,921 B2
(45) Date of Patent: Nov. 15, 2005

(54) BASE OF HANDHELD DEVICE HAVING EMAIL ACCESS FUNCTION

(76) Inventors: Ho-Lung Lu, No. 7, Lane 80, Chung Hsiao Rd., Panchiao City, Taipei Hsien (TW); Yuan Lung Chang, 4F, No. 228, Min An Rd., Hsinchuang City, Taipei Hsien (TW)

( * ) Notice: Subject to any disclaimer, the term of this patent is extended or adjusted under 35 U.S.C. 154(b) by 654 days.

(21) Appl. No.: 10/072,927

(22) Filed: Feb. 12, 2002

(65) Prior Publication Data

US 2003/0150912 A1    Aug. 14, 2003

(51) Int. Cl.7 .......................... G06F 15/16; G06F 13/00
(52) U.S. Cl. ...................................... 709/206; 710/303
(58) Field of Search ................................ 709/202, 206, 709/213, 216, 249, 205, 248; 710/303, 304

(56) References Cited

U.S. PATENT DOCUMENTS

| | | | | |
|---|---|---|---|---|
| 5,999,932 A | * | 12/1999 | Paul ............................. | 707/10 |
| 6,161,130 A | * | 12/2000 | Horvitz et al. .............. | 709/206 |
| 6,266,539 B1 | * | 7/2001 | Pardo ....................... | 455/556.2 |
| 6,657,654 B2 | * | 12/2003 | Narayanaswami ....... | 348/14.04 |
| 6,763,458 B1 | * | 7/2004 | Watanabe et al. ........... | 713/100 |
| 6,798,647 B2 | * | 9/2004 | Dickie ........................ | 361/683 |
| 2002/0103008 A1 | * | 8/2002 | Rahn et al. ................. | 455/557 |
| 2002/0119800 A1 | * | 8/2002 | Jaggers et al. .............. | 455/550 |

FOREIGN PATENT DOCUMENTS

| | | | | | |
|---|---|---|---|---|---|
| JP | | 10283282 A | * | 10/1998 | ........... G06F 13/00 |
| JP | | 2000244555 A | * | 9/2000 | ........... H04L 12/54 |

* cited by examiner

*Primary Examiner*—Marc D. Thompson
*Assistant Examiner*—Yemane M. Gerezgiher
(74) *Attorney, Agent, or Firm*—Rosenberg, Klein & Lee

(57) ABSTRACT

The present invention provides a base of handheld device having Email access function. The base can connect to a computer or an information network to access Email data package of an Email, and display the content of the Email via the handheld device. The base comprises a casing having a receiving groove thereon for exactly receiving the handheld device. A control circuit board is disposed in the casing. The control circuit board comprises a control unit, a memory unit, and a transmission unit. The control unit is used to download the data package of the Email from the computer or the information network or to transfer the content of the Email to the handheld device for display. The memory unit is used to store an Email access program and memorizing the accessed Email data. The transmission unit is used to connect to the computer or the information network.

9 Claims, 7 Drawing Sheets

BASE OF HANDHELD DEVICE HAVING EMAIL ACCESS FUNCTION

FIELD OF THE INVENTION

The present invention relates to a base of handheld device having Email access function and, more particularly, to a base of a handheld device (e.g., a personal digital assistant (PDA) or a mobile phone), which can access Emails in a computer or on an information network and then display the content of the Emails via the handheld device.

BACKGROUND OF THE INVENTION

Handheld devices are small portable electronic devices like PDAs, mobile phones, palm computers, etc. Generally speaking, the handheld device cannot directly access network, and needs another accessory device to achieve network access. Moreover, because the capacity of the inbuilt storage memory of the handheld device is very small, even if it can access network, only the contents of emails can be read on the network, but the emails cannot be downloaded, resulting in much inconvenience.

Besides, in addition to text information, an Email usually has some appended files like jpg picture files, mpeg video files, or exe execution files. Although access of these appended files on a general computer has no problem, if the handheld device is used to access the Email, these appended files cannot be downloaded or the handheld device may crash because these appended files are large and the memory of the handheld device is insufficient. It is unable to inquire about whether there are appended files therein or how large these appended files are in advance when accessing the Email. This is thus a difficult problem to be solved.

Accordingly, the present invention aims to propose a base of handheld device having Email access function, wherein the base is disposed in a handheld device without changing the design of the original handheld device. The base can access an information network directly or via a computer to download an Email and then display the content of the Email via the handheld device.

SUMMARY OF THE INVENTION

The primary object of the present invention is to provide a base of handheld device having Email access function, which can be used to receive a handheld device and connect to a computer or access an information network so as to download Email data.

The secondary object of the present invention is to provide a base of handheld device having Email access function, which can achieve information connection with a computer in wired or wireless transmission way. Wired transmission is achieved by means of RS-232 or universal serial bus (USB). Wireless transmission is achieved by means of infrared or radio-frequency (RF) transmission.

Another object of the present invention is to provide a base of handheld device having Email access function, which can connect to a local area network (LAN) by using an Ethernet interface to download Emails.

Yet another object of the present invention is to provide a base of handheld device having Email access function, which can connect to the Internet by using a modem interface to download Emails.

Still yet another object of the present invention is to provide a base of handheld device having Email access function, which can discriminate and classify downloaded Emails in advance and then store them so that a handheld device can sieve out a relevant Email for reading or only read out a small part of the Email.

The present invention relates to a base of handheld device having Email access function. The base can connect to a computer or an information network to access Email data package of an Email, and a handheld device can be used to display the content of the Email. The base comprises a casing having a receiving groove thereon for exactly receiving the handheld device. A control circuit board is disposed in the casing. A plurality of electric contacts are disposed in the receiving groove. The electric contacts are used for data exchange between the handheld device and the control circuit board. The control circuit board comprises a transmission unit used to connect to a computer or an information network for download of Emails. The transmission unit can be a USB interface, an RS-232 interface, an IrDA transmission interface, or an RF transmission interface connected to a compute. The transmission unit can also be an Ethernet interface connected to a LAN or a modem interface connected to the Internet.

The present invention is also characterized in that the control circuit board of the above base further comprises a control unit, a memory unit, and a mail discrimination unit. The control unit is controlled by the handheld device to download the Email data package from the computer or the information network or to transfer the data content of the Email to the handheld device. The memory unit is controlled by the control unit for storing an Email access program and memorizing the accessed Email data. The mail discrimination unit is used to discriminate the content and format of the Email and then store into the memory unit.

The various objects and advantages of the present invention will be more readily understood from the following detailed description when read in conjunction with the appended drawing, in which:

DETAILED DESCRIPTION OF THE PREFERRED EMBODIMENTS

The present invention is exemplified with a PDA. In the present invention, a handheld device 1 is connected to a computer 3 or an information network to access Email data package of an Email 5 by using a base 2. A display screen 100 of the handheld device 1 is then used to display the content of the Email 5.

Figure 1:
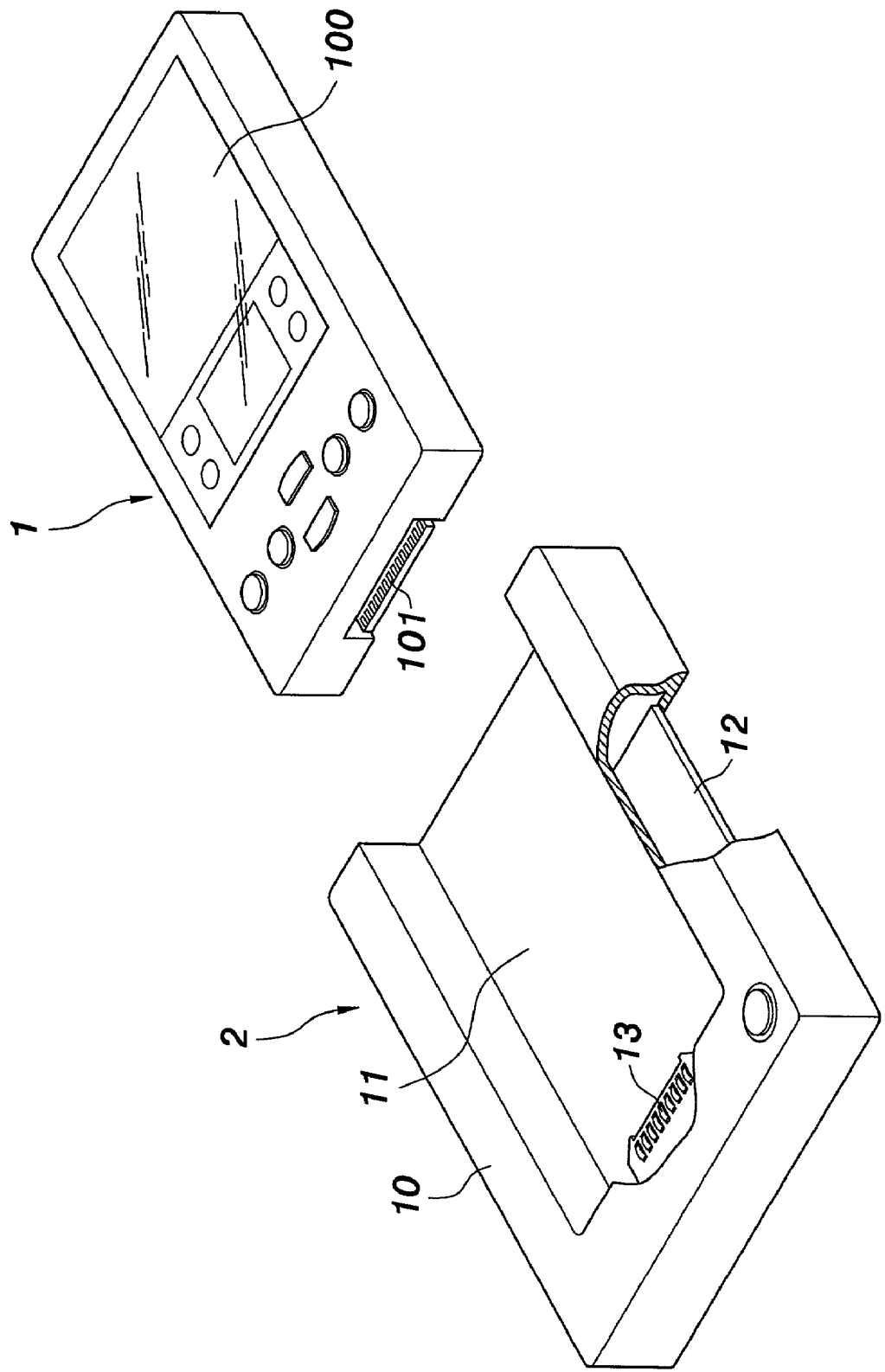
FIG. 1 is a perspective view of an embodiment of the present invention combined with a PDA.
Figure 2A:
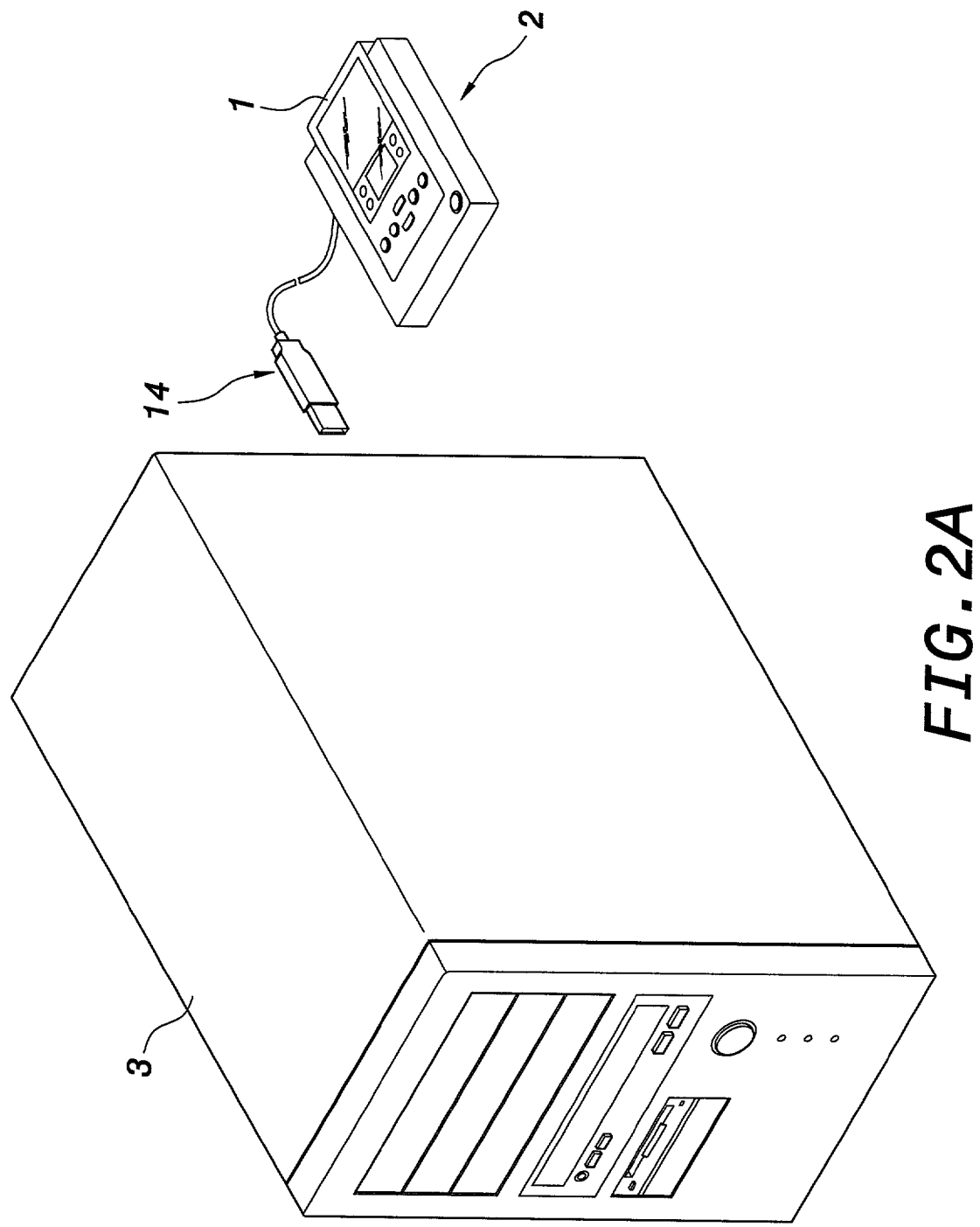
FIG. 2A is a perspective view of the present invention connected to a computer via a USB interface.
Figure 2B:
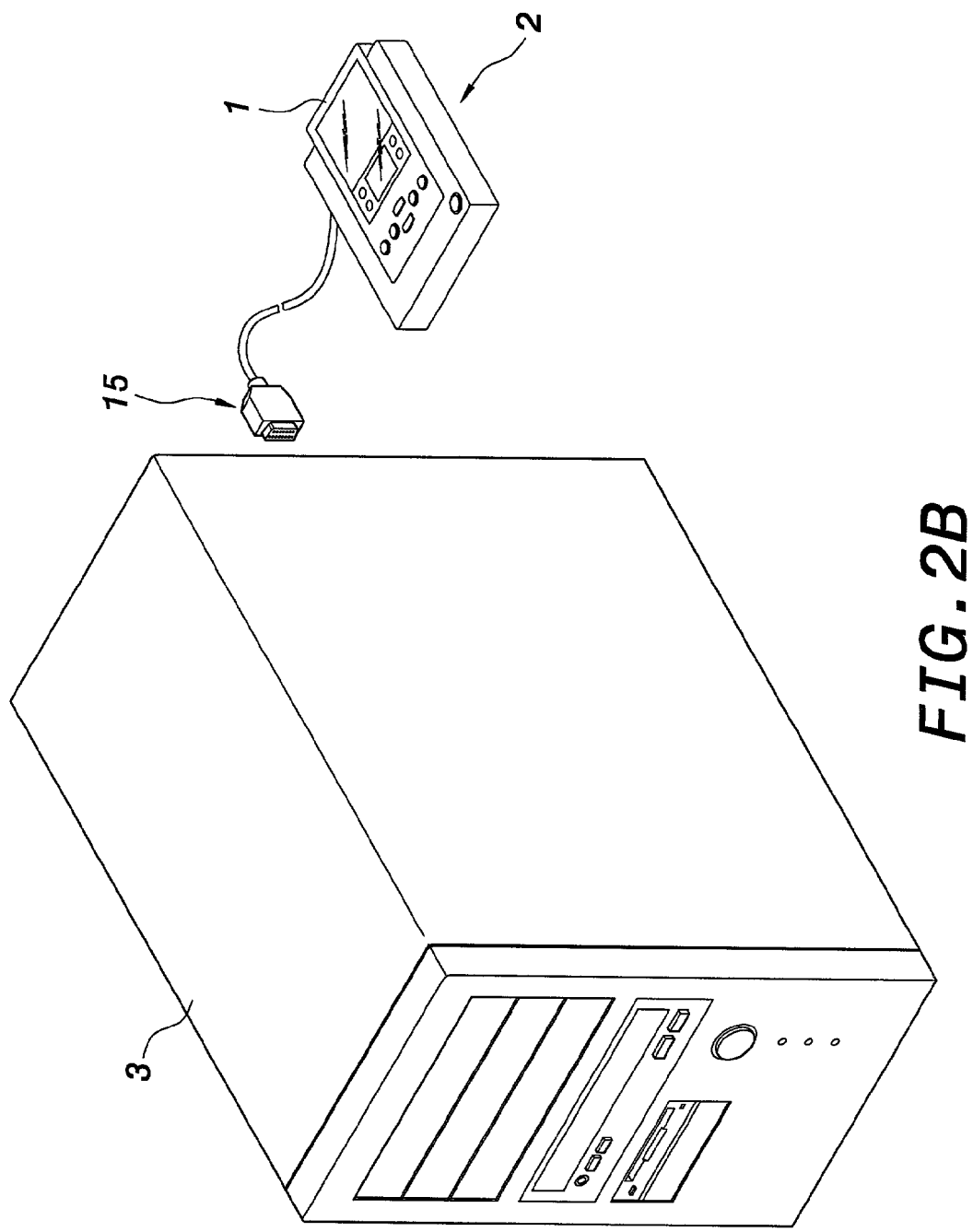
FIG. 2B is a perspective view of the present invention connected to a computer via an RS-232 interface.

As shown in FIG. 1, the base 2 of the present invention comprises a casing 10 having a receiving groove 11 thereon for exactly receiving the handheld device 1. The casing 10 has a control circuit board 12 therein. A plurality of electric contacts 13 are disposed in the receiving groove 11. A plurality of electric contacts 101 are also disposed on the handheld device 1. The electric contacts 13 of the receiving groove 11 mate with the electric contacts 101 of the handheld device 1, and are used for data exchange between the handheld device 1 and the control circuit board 12. The control circuit board 12 can be connected to a computer 3 via a USB interface 14 (FIG. 2A) or an RS-232 15 (FIG. 2B). Of course, the wired transmission interfaces can be replaced with wireless transmission interfaces including IrDA transmission interface (not shown) and RF transmission interface (not shown).

Figure 3A:
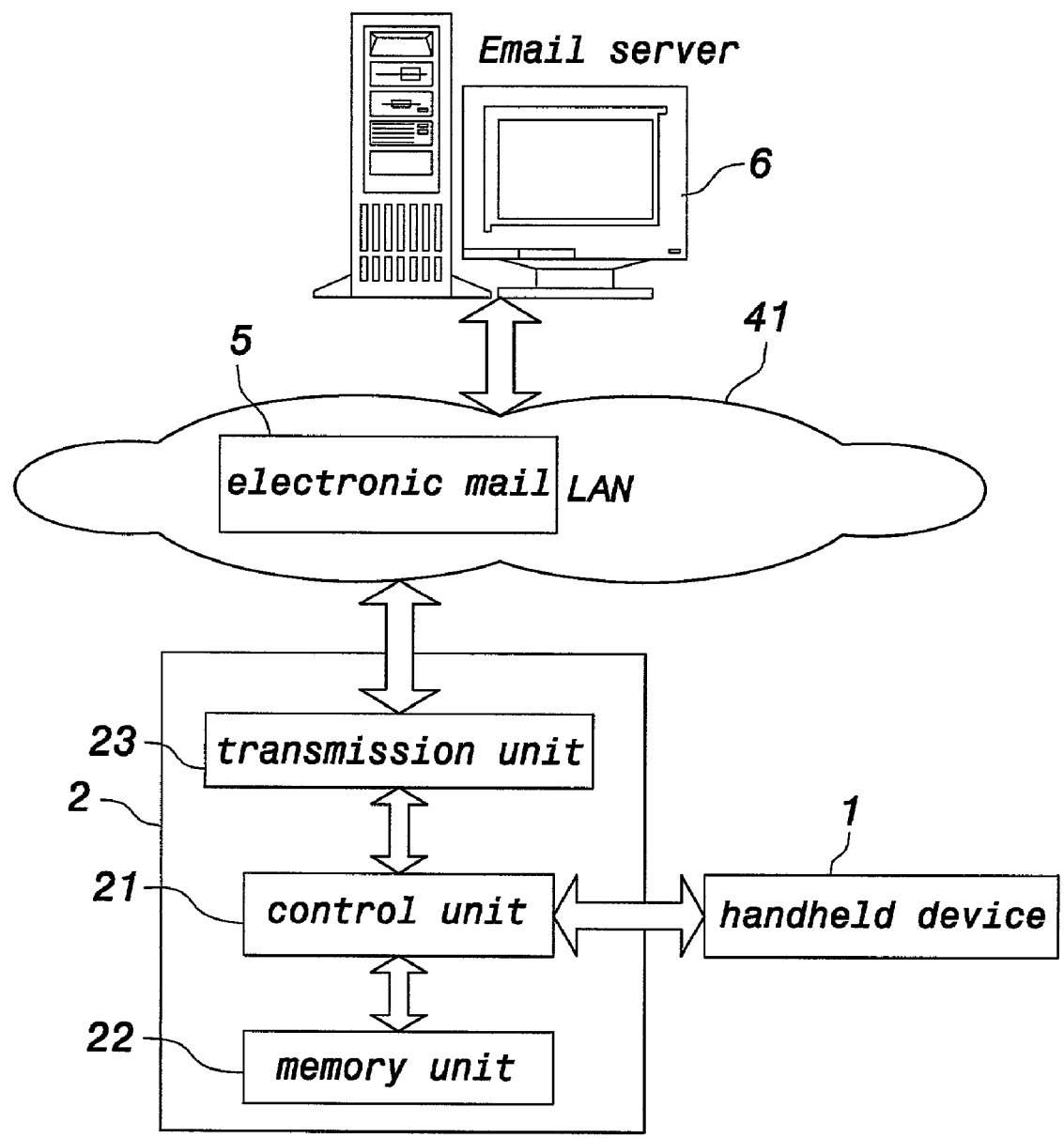
FIG. 3A is a block diagram of the present invention connected to a LAN via an Ethernet interface.

As shown in FIG. 3A, the control circuit board 12 in the base 2 of the present invention comprises a control unit 21, which is used to receive control commands of the handheld device 1 to download the Email data package of the Email 5 via a LAN 41 or to transfer the data content of the Email 5 to the handheld device 1.

The program for downloading the Email 5 is stored in a memory unit 22, which is controlled by the control unit 21. The data content of the downloaded Email 5 is also stored in the memory unit 22. The memory unit 22 is composed of nonvolatile memory components.

Figure 3B:
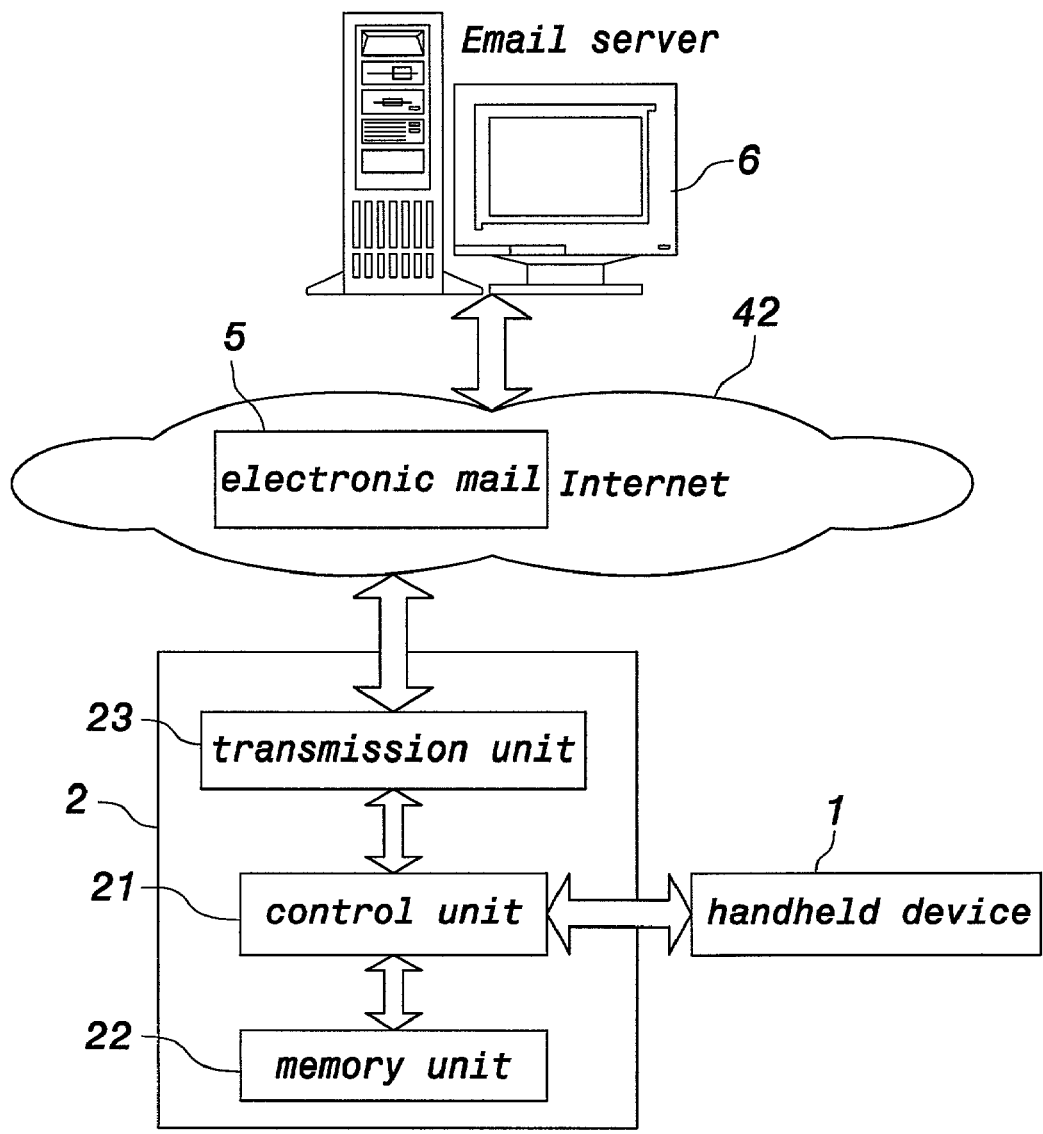
FIG. 3B is a block diagram of the present invention connected to the Internet via a modem.

The control circuit board 12 of the present invention can be connected to the computer 3 or the information network. A transmission unit 23 is disposed on the control circuit board 12. The transmission unit 23 can be an Ethernet interface (FIG. 3A) for digital information exchange between the control unit 21 and the LAN 41. In other words, the transmission unit 23 can download the Email data package of the Email 5 in an Email server 6 via the LAN 41. The transmission unit 23 of the present invention can also be a modem interface (FIG. 3B), which is used to connect to the Internet 42 to download the Email data package of the Email 5 in the Email server 6.

Figure 4:
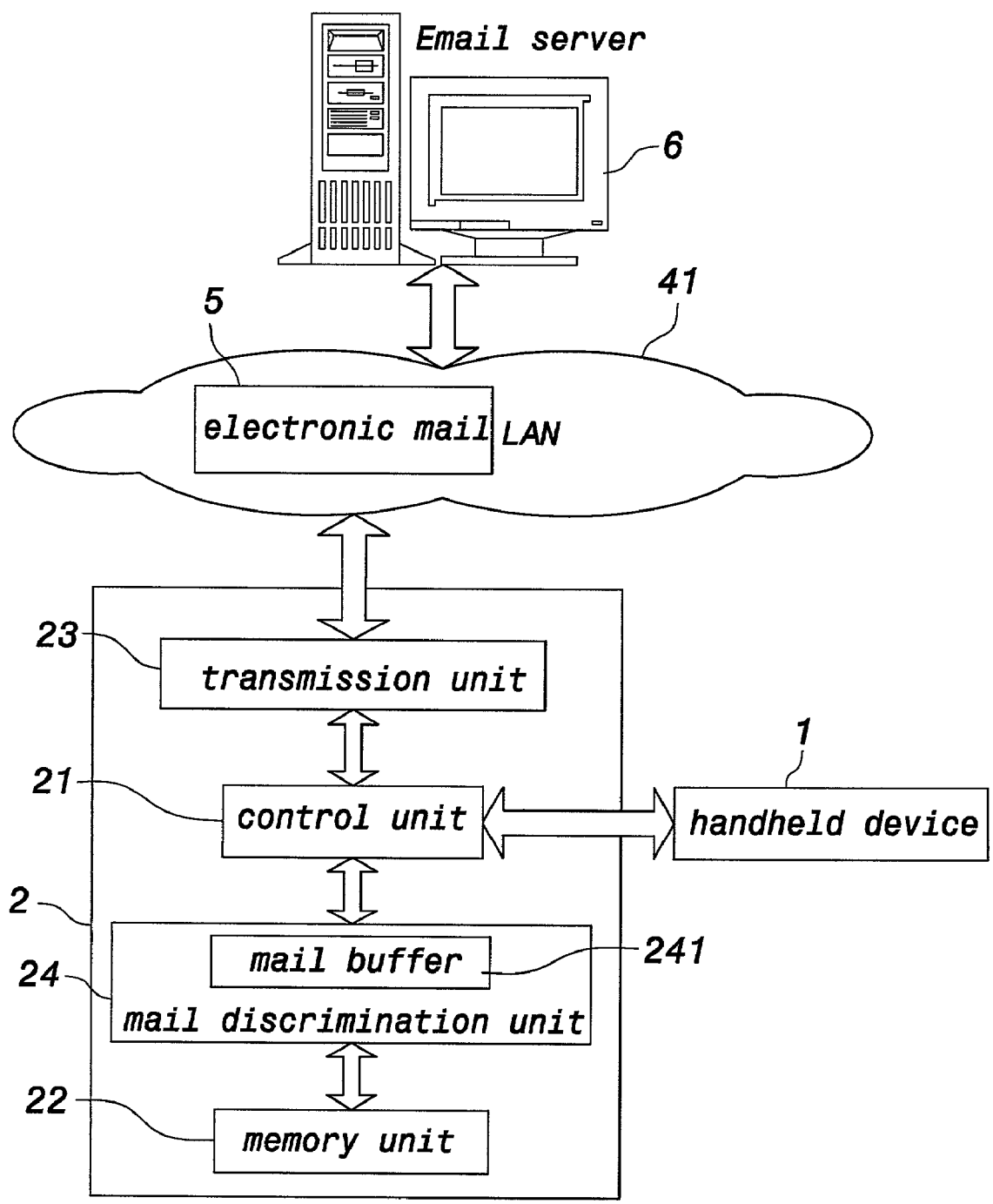
FIG. 4 is a block diagram of an embodiment of the present invention having a mail discrimination unit.

As shown in FIG. 4, the control circuit board 12 of the present invention further comprises a mail discrimination unit 24, which is used to discriminate the content and format of the Email 5 and then store into the memory unit 22. The mail discrimination unit 24 comprises a mail buffer 241 for temporarily storing the data of the Email 5. After the content and format of the Email 5 are discriminated by the mail discrimination unit 24, the data of the Email 5 is then stored into the memory unit 22.

Figure 5:
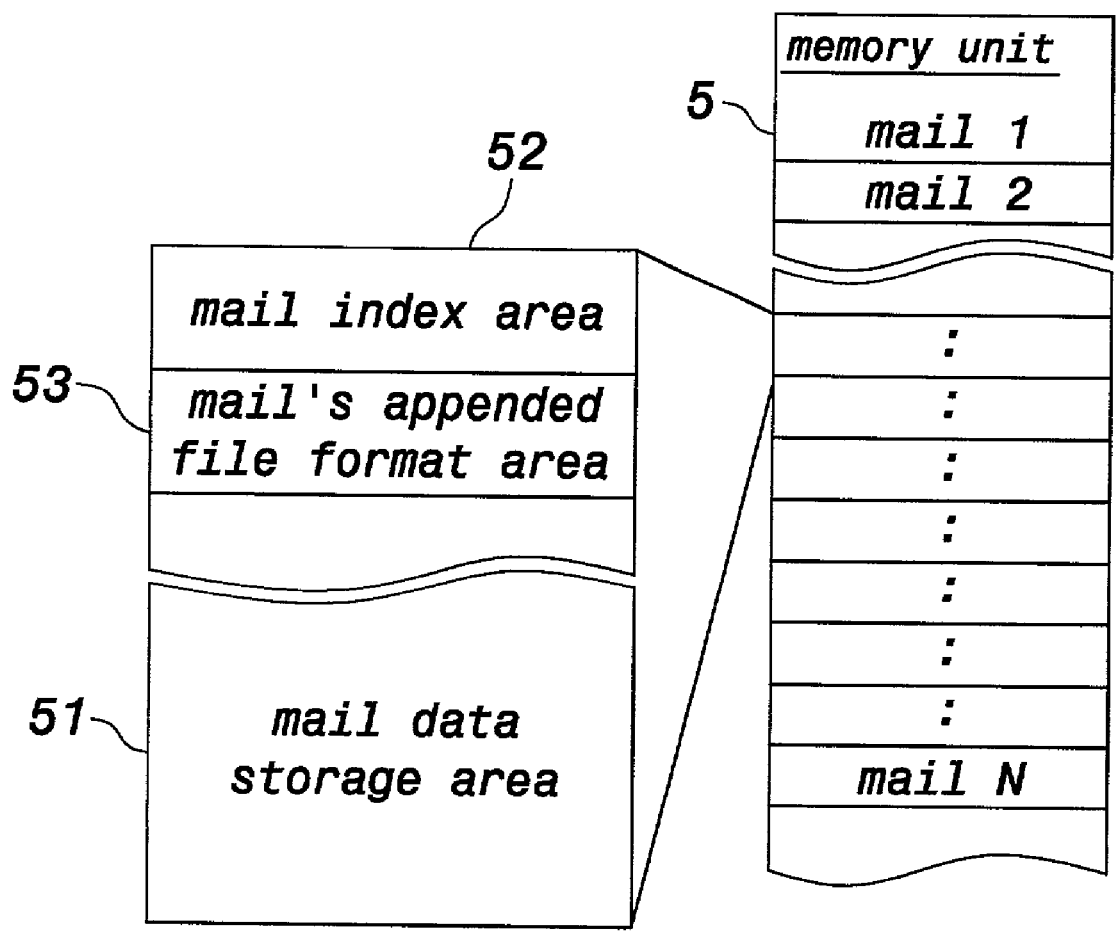
FIG. 5 is a diagram showing the storage format of Email of the present invention.

As shown in FIG. 5, the mail discrimination unit 24 of the present invention discriminates and classifies the content of the Email 5 into mail full text data, mail index data, and mail's appended file data. The memory unit 22 can store a plurality of mails (e.g., mails 1~N in FIG. 5). Each mail comprises a mail data storage area 51, a mail index area 52, and a mail's appended file format area 53. The mail data storage area 51 is used to store the mail full text data including sender's data, receiver's data, theme, and mail content. The mail content is text data or HTML format data. The mail index area 52 is used to separately store index record in the Email data package of the Email 5. The mail's appended file format area 53 is used to store appended files in the Email 5. The object of classifying the Email 5 is to let the handheld device 1 sieve out mail data or an appended file to be read, or read out a small part of mail, thereby avoiding crash down of the handheld device 1 because of insufficient memory.

To sum up, the present invention provides a base capable of connecting to a computer or an information network to download an Email and then displaying the Email via a handheld device.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A base of handheld device having Email access function, said base being capable of connecting to a computer or an information network to access Email data package of an Email and displaying a content of said Email via a display screen of a handheld device, said base comprising:
    a casing having a control circuit board received therein, a plurality of electric contacts being disposed on said casing for data exchange between said handheld device and said control circuit board;
    a control unit disposed on said control circuit board, said control unit being controlled by said handheld device to download the Email data package of said Email and to transfer the content of said Email to said handheld device;
    a memory unit disposed on said control circuit board and controlled by said control unit, said memory unit containing a mail access program and accessed data of said Email stored therein; and
    a transmission unit for digital information exchange between said control circuit board and the computer or the information network.

2. The base of handheld device having Email access function as claimed in claim 1, wherein said casing has a receiving groove formed thereon, said handheld device being received in said receiving groove.

3. The base of handheld device having Email access function as claimed in claim 1, wherein said transmission unit includes an interface from a group consisting of an Ethernet interface, a modem interface, a USB interface, an RS-232 interface, an IrDA transmission interface, and an RF transmission interface.

4. The base of handheld device having Email access function as claimed in claim 1, further comprising a mail discrimination unit discriminating and classifying the content and format of said Email to be stored in said memory unit.

5. The base of handheld device having Email access function as claimed in claim 4, wherein said mail discrimination unit further comprises a mail buffer for temporarily storing data of said Email.

6. The base of handheld device having Email access function as claimed in claim 1, wherein said memory unit comprises:
    a mail data storage area for storing data of said Email;
    a mail index area for separately storing index record in the Email data package of said Email; and
    a mail's appended file format area for storing appended files in said Email.

7. The base of handheld device having Email access function as claimed in claim 6, wherein the mail data stored in said mail data storage area comprises sender's data, receiver's data, theme, and mail content.

8. The base of handheld device having Email access function as claimed in claim 6, wherein the mail data stored in said mail data storage area is text data or HTML format data.

9. The base of handheld device having Email access function as claimed in claim 1, wherein said memory unit includes nonvolatile memory components.

* * * * *